United States Patent
Moeller et al.

[19]

[11] Patent Number: 5,959,426
[45] Date of Patent: Sep. 28, 1999

[54] CIRCUIT CONFIGURATION FOR AFFECTING THE STEP FREQUENCY IN THE WINDING-CURRENT ACTIVATION OF STEPPING MOTOR DRIVES WITH CHOPPED POWER OUTPUT STAGES

[75] Inventors: Siegfried Moeller, Rottweil; Elmar Speck, Boettingen, both of Germany

[73] Assignee: BDT Buro Und Datentechnik, Germany

[21] Appl. No.: 08/815,836

[22] Filed: Mar. 12, 1997

[51] Int. Cl.[6] .................................................. H02P 8/14
[52] U.S. Cl. ............................................ 318/685; 318/696
[58] Field of Search .................................. 318/254, 685, 318/696, 700, 701

[56] References Cited

U.S. PATENT DOCUMENTS

| | | | |
|---|---|---|---|
| 4,223,260 | 9/1980 | Beer et al. | 318/696 |
| 4,414,498 | 11/1983 | Gessner | 318/696 |
| 4,431,955 | 2/1984 | Faedi et al. | 318/696 |
| 4,961,037 | 10/1990 | Orii et al. | 318/696 |
| 5,148,092 | 9/1992 | Ishiii | 318/696 |

FOREIGN PATENT DOCUMENTS 4121617  1/1993  Germany.

*Primary Examiner*—Bentsu Ro
*Attorney, Agent, or Firm*—Higgs, Fletcher & Mack LLP; Bernard L. Kleinke

[57] ABSTRACT

Bipolarity current-activated windings of powerful stepping motors for high step frequencies are to be indexed such that for each load condition the optimum motor torque is attained. The circuit configuration according to the invention comprises for this purpose chopped power output stages ((1, 2)) which are each activated by direction-dependent logic phase signals (PH12, PH34) of a signal generator (3) for the current feed into the motor windings of the stepping motor drive. Via a chopper pulse weighting circuit (4.2) winding indexing signals are supplied to the signal generator (3). To the chopper pulse weighting circuit (1,2) are supplied logic chopper signals (CH12, CH34) which can be tapped at the power output stages ((1, 2)) at the output side, and a device (7,14) connected to the chopper pulse weighting circuit (4.2) ensures that always only that chopper signal (CH12 CH34) is conducted to the chopper pulse weighting circuit (4.2), which is decisive for the next winding switch-over.

14 Claims, 4 Drawing Sheets

CIRCUIT CONFIGURATION FOR AFFECTING THE STEP FREQUENCY IN THE WINDING-CURRENT ACTIVATION OF STEPPING MOTOR DRIVES WITH CHOPPED POWER OUTPUT STAGES

CROSS-REFERENCE TO RELATED APPLICATIONS

This application is based on co-pending priority German Patent Application No. 196 09 803.3.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

Cross-reference to related applications

TECHNICAL FIELD

The invention relates to a circuit configuration for affecting the step frequency in the winding current supply of stepping motor drives with chopped power output stages, each of which can be driven by direction-dependent logic phase signals of a signal generator for the current feed into the motor windings of the stepping motor drive, and with a chopper pulse weighting circuit connected at the output end to the signal generator, to which can be supplied logic chopper signals tappable at the power output stages at the output end.

BACKGROUND ART

Such circuit configuration is already disclosed in DE 41 21 617 A1. The circuit configuration described serves for the winding activation of stepping motor drives, for example office machine, printers, accessory equipment feeding or outputting paper for printers etc., which are subject to extreme load fluctuations and do not have available a decoder device for determining the rotor position and in which the in-step running of the stepping motor drive has precedence over a constant step frequency. The known circuit configuration supplies an indexing signal for affecting the winding switch-over frequency so as to be adapted to the load of the stepping motor drive and utilizes the fact that the pulse width of the chopper signals at the output of the power output stages contains information about the position of the magnet wheels of the stepping motor. In addition, in the known circuit configuration a fixedly set time window is realized. When the current flow phase of the chopper signals is for the first time shorter than this time window, this is detected and utilized as winding indexing criterion. The circuit configuration thus supplies an indexing signal for the load-adapted affecting of the winding switch-over frequency for the stepping motor driving.

For this purpose the known circuit configuration comprises chopped power output stages for the current feed into the motor windings of the stepping motor drive. These power output stages are driven via a signal generator, at the output of which are present phase control signals. The signal generator is connected at the input side to a so-called chopper pulse weighting circuit to which, in a feedback loop, logic chopper pulses can be supplied which can be tapped at the power output stages. The logic chopper signals of both power output stages are each supplied to an input of an AND-element of the chopper pulse weighting circuit and are thus weighting concurrently. Since the pulse-duty factor via the chopper pulse sequence cannot be drawn on alone as winding indexing criterion, since during the driving pauses the pulse-duty factor becomes zero, in the known circuit configuration a special circuit is realized in order to generate a fixed time window within the chopper pulse weighting circuit. The duration of the time window is herein adapted to the chopper characteristic of the stepping motor drive. The duration of the time window is conceived such that during the relatively long current rise phases at the start of the driving of a motor winding as well as also with the ending of the current flow phases before the optimum tooth meshing of rotor and stator teeth of the stepping motor the time window is completed before the particular current flow phase is also completed. However, if the current flow phase for the first time is shorter than the running time of the time window, this state is detected in the chopper pulse weighting circuit and is utilized as the winding indexing criterion.

In this circuit configuration the simultaneous weighting of the logic chopper signals applied at the two inputs of the AND-element is problematic. This can lead to an error weighting of the chopper pulses with synchronously chopped power output stages. This is the case if suddenly at one of the inputs of the AND-element chopper pulses occur which are not decisive for the weighting of the next winding switch-over. These momentary chopper signals which, however, are not to be weighted, with, for example, long chopper pulses of the one output stage can mask short chopper pulses of the other output stage, which is of disadvantage and does not lead immediately to the formation of the winding indexing criterion. Therefore, the actual position of the magnet wheels cannot be determined exactly whereby the power capability of the motor cannot be utilized maximally.

Problematic in the known circuit configuration is furthermore that the length of the time window with the adaptation to the chopper characteristic of the stepping motor is predetermined. If the circuit configuration is used, for example, for another motor type, this time window would need to be adapted in terms of hardware to the chopper 2 characteristic of the new motor.

Lastly, due to the fixedly given time window it is not possible to adapt the length of the time window, and thus the weighting time, to the different running phases of the stepping motor drive without change of hardware. In addition, in the known circuit configuration a stepping operation of the stepping motor drive is not possible if at the output of the chopper pulse weighting circuit no indexing pulses are made available.

SUMMARY OF THE INVENTION

The invention therefore addresses the problem of further developing the circuit configuration described in the introduction for the winding-current activation of stepping motor drives such that the maximum meshing between rotor and stator teeth is recognized with greater time precision and an error-free winding indexing signal is made available at the output of the chopper pulse weighting circuit for the winding switch-over.

This problem is solved in a circuit configuration with the characteristics of the preamble of claim 1 thereby that a device connected to the chopper pulse weighting circuit is provided, which is precisely decisive for the next winding switch-over.

The device comprises preferably a phase-selection circuit and a switch-over device with the phase-selection circuit making available a phase-selection signal which indicates which of the phase signals at the output of the signal generator of the circuit configuration has last shown a given logic state.

The switch-over device, in the simplest case a 1-by-2 multiplexer, comprises a first input for impressing a first chopper signal and a second input for impressing a second chopper signal. The switch-over device comprises an output connection connected with the input terminal of the chopper pulse weighting circuit and a control connection for impressing said phase-selection signal. Via the phase-selection signal the switch-over device is specifically switched over such that only that chopper signal can arrive at the chopper pulse weighting circuit, which is decisive for the next winding switch-over.

Although the phase-selection circuit can be implemented in any desired way, the use of an RS flip-flop is advisable at whose output the phase-selection signal can be tapped. For this purpose the RS flip-flop comprises a reset input as well as a set input, which are each connected via a configuration with an RC-section and a logic gate to an output terminal of the signal generator and at these output terminals phase signals for driving a power output stage of the stepping motor drive can be tapped.

The configuration comprises preferably an EXOR gate whose first input is connected directly and whose second input via said RC-section with the particular output terminal of the signal generator.

In a further development of the invention is provided to provide the chopper pulse weighting circuit with a time register for the time basis to be weighted and the register content of the time register is variable. This permits adapting the length of the time window to different chopper characteristics of different stepping motor drives. It is also possible to respond with a change of the register content of the time register to different running phases of the stepping motor drive and to affect the length of the time window conceived for the weighting independently of the hardware. The possibility is moreover given of forcing a winding indexing independently of the formation of the indexing criterion The register content of the time register is preferably variable via a control signal of a control device, for example a microprocessor. Such microprocessor is usefully also electrically connected with the signal generator. If the chopper pulse weighting circuit comprises a time register, whose register content is variable according to motor type and within any running phase, the length of the time window, and thus the weighting time, can be varied without changing the hardware.

In a preferred further development of the invention a start-up circuit is provided with which independently of the winding indexing signal at the output of the chopper pulse weighting circuit a winding indexing can be forced. For this purpose, the already cited microprocessor makes available at an output terminal a control signal which makes available to the trigger input a lower stepping motor-dependent step frequency of, for example, approximately 250 to 350 Hertz of the signal generator. This lower stepping frequency is only supplied to the trigger input of the signal generator if for some reason no winding indexing signal is to be made available or utilized at the output of the chopper pulse weighting circuit. This can be the case, for example, if the stepping motor used is started and no weightable indexing-enable signal is formed yet or if the stepping motor used is fully overloaded, a continuous rotational motion is no longer executed so that the indexing-enable signal is not formed or is not formed in a timely manner.

The switch-over devices, the phase-selection circuit, the signal generator, and the chopper pulse weighting circuit are preferably realized through a further microprocessor.

The circuit configuration according to the invention is capable of detecting via the weighting of the chopper pulse width typical of the motor and operating point the time in time at which the maximum pole meshing of the rotor and stator poles of the motor has been passed over so that a winding indexing can take place.

Due to the circuit configuration according to the invention, the motor accelerates automatically without presetting of the number and duration of acceleration steps from a base frequency to the target frequency and, in the event of overloading, reduces automatically the step frequency from the target frequency to the base frequency before the motor loses steps. Depending on the load conditions, the motor accelerates also automatically again into the target frequency if the overload conditions are eliminated.

A circuit configuration by example of the invention in summary comprises a circuit device for the selection of the logic chopper signals which, in the simplest case, can be a 1-by-2 multiplexer. This is preceded by a chopper pulse weighting circuit. The circuit device for selecting the chopper signals is controlled by a phase-selection circuit which detects the particular last phase change and controls the signal selection such that only the chopper signal relevant for the next winding switch-over is supplied to the chopper pulse weighting circuit. The chopper pulse weighting circuit comprises a time register which stores the time for which the chopper pulse weighting circuit checks the chopper pulses. The content of the time register is variable via a control signal and between the output of a logic AND-gate, which links the indexing-enable signal with a timer signal, and the input of the signal generator for the formation of the phase signals for driving the output stages, a logic OR-gate is connected via whose one input through a signal a winding indexing can be forced without the effect of the indexing-enable signal.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

In the following the invention will be explained in further detail in conjunction with four Figures with reference to an embodiment example. In the drawing depict.

Figure 1:
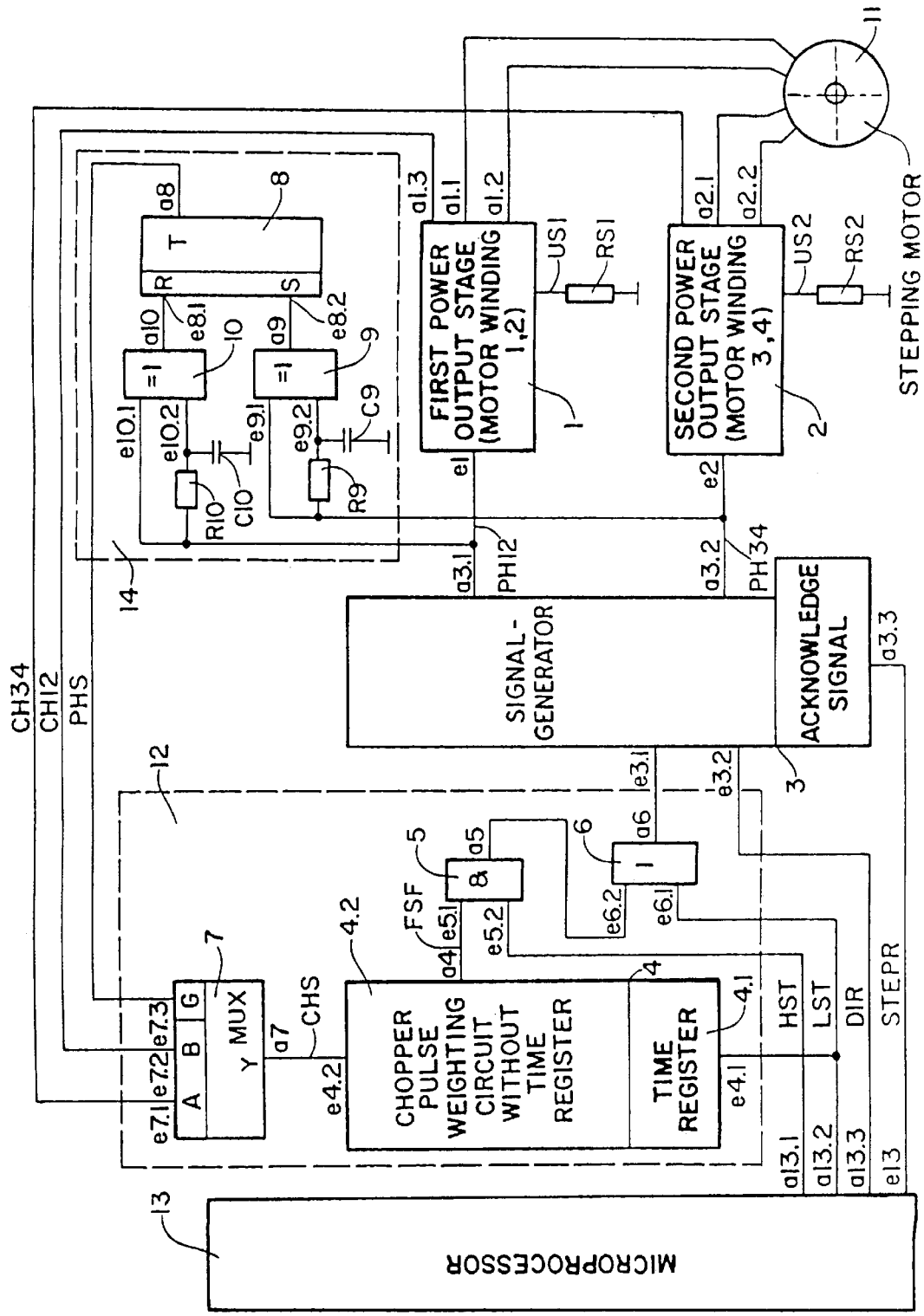
FIG. 1 a block circuit diagram of the circuit configuration according to the invention, FIG. 2 the schematic representation of the signal traces as a function of the different positions of the magnet wheels of the stepping motor drive. The lines shown in FIG. 2 depict the following.

a: position of the magnet wheels of a stepping motor 11 relative to one another with an assumed direction of rotation in which the rotor teeth pass the stator teeth of the stepping motor 11 from left to right, wherein a. 1: represents the different magnet wheel positions for the motor winding 1, 2 of the stepping motor 22 and a. 2: the magnet wheel positions of the motor winding 3, 4 relative to the magnet wheel positions of the motor winding 1, 2, b: representation of the inductance trace for the motor winding inductances L1,2 (solid line)/L3,4 (dashed line) as a function of the tooth meshing, c: phase signal PH12 at the output of a signal generator 3 of the circuit configuration for selecting the current direction through a first power output stage 1 for the motor winding 1,2 of the stepping motor 11, d: the phase signal PH34 at the output of the signal generator 3 for selecting the current direction through power output stage 1, 2 for the motor winding 3,4, e: a logic chopper signal CH12 tappable at the output of the first power output stage 1, as a function of the phase signal PH12, f: a logic chopper signal CH34 tappable at the second power output stage 2, as a function of phase signal PH34, g: a phase-selection signal PHS for selecting one of the two logic chopper signals CH12/CH34, h: a chopper signal CHS selected in a switch-over device 7, which contains time-selectively the logic chopper signals CH12 or CH34, respectively, i: an indexing-enable signal FSF for enabling the next winding switch-over as a function of the chopper signal CHS, and j: a signal HST of a clock generator which has the target frequency of the stepping motor, for enabling the next winding switch-over.

Figure 3:
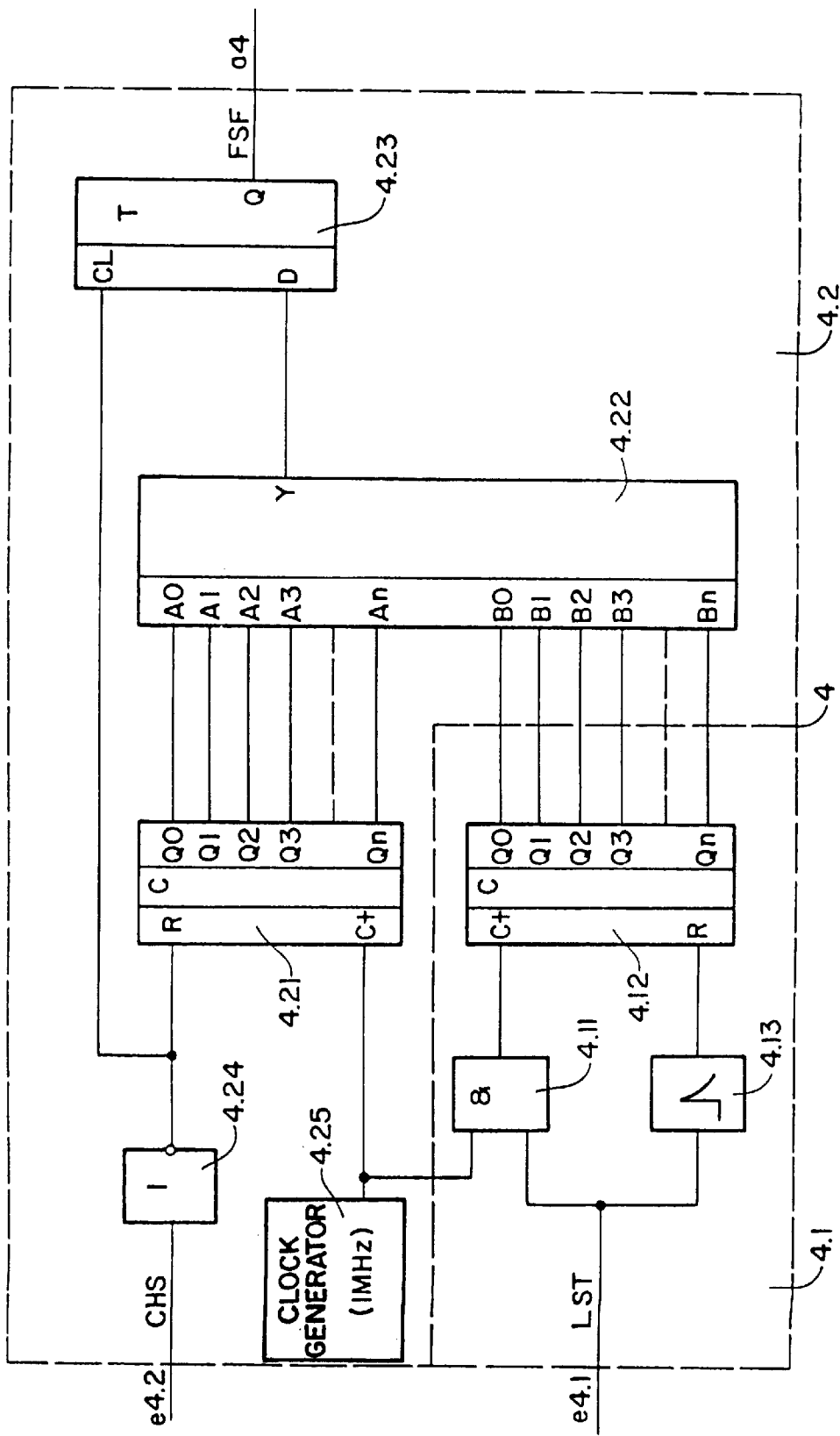
Figure 4:
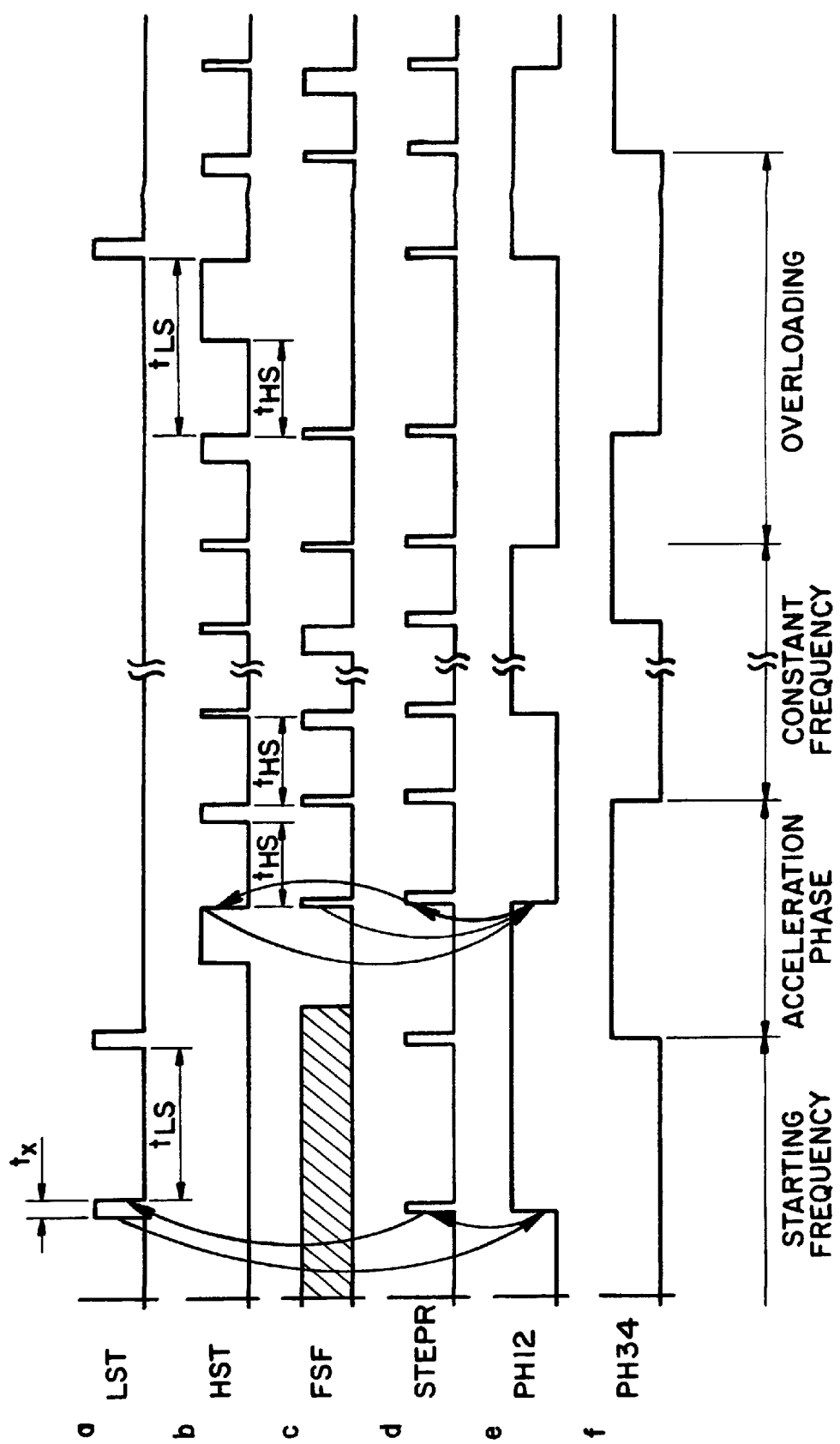

FIG. 3 a possible embodiment of the chopper pulse weighting circuit comprised in the circuit configuration of FIG. 1, and FIG. 4 the schematic representation of the signal traces in the circuit configuration of FIG. 1 under different load conditions.

BEST MODE FOR CARRYING OUT THE INVENTION

In FIG. 1 is depicted a block circuit diagram of a possible embodiment example of a circuit configuration for activating a changeably-loaded stepping motor 11, in which strongly different load current moments can occur and, nevertheless, an optimum timing of the winding switch-over is ensured free of error for any condition of loading. Such changeably-loaded stepping motor can, for example, be used in a fast pin printer in which the time sequence of the winding switch-over of the stepping motor can be realized free of error with only one driving circuit even under different conditions of loading (for example, idling or loading by a Leporello device with document distribution in connection with an emplaced paper feeder).

Furthermore, the circuit configuration of FIG. 1 can also be used in a document distribution device of a laser printer. The document distribution device of a laser printer, which acquires the printed documents from the laser printer and distributes them sorted in compartments, requires a suitable stepping motor drive for driving the transport rollers. The internal document transporting system of the document distribution device must acquire the documents from the printer and transfer them to a further transporting system with which no rigid mechanical synchronization exists. Since the documents can have great differences, in particular with respect to document length and weight of the paper, and since it is possible through mechanical tolerance that the real document speeds of the transferring and acquiring transporting systems do not exactly agree, extreme load fluctuations for the drive of the document distribution device can occur.

In particular, if the document acquisition speed of the document distribution device is higher than the transfer speed of the printer, overloading of the drive of the document distribution device and stepping losses can occur or the stepping motor drive can get completely out of step. If the printer speed is lower than the acquisition speed of the document distribution device, the overloading of the stepping motor drive of the document distribution device is to be avoided such that the stepping motor does not get out of step or stop completely.

For realizing this task that a stepping motor without stepping loss is loadable within broad limits and automatically adapts the step frequency to the load conditions, an activation process was developed in which, using chopped power output stages for the current limitation in the motor windings, from the length of the chopper pulses information can be derived regarding the point in time at which the magnet wheels/teeth of the stepping motor have run past the maximum meshing so that starting from the point of overrun of this magnet wheel position an indexing of the winding combination for the stepping motor is possible or meaningful. A circuit suitable for this purpose is shown in FIG. 1. For an explanation of the circuit configuration depicted in FIG. 1 for purposes of disclosure reference is expressly made to DE 41 21 617 cited in the introduction. This publication already discloses a circuit configuration for the generation of logic winding indexing information for the winding-current activation of changeably loaded stepping motor drives. This known circuit configuration is-expanded according to the invention by various circuit components such that erroneous weighting of the logic chopper pulse signals CH12, CH34 can no longer occur.

The circuit configuration of FIG. 1 specifically comprises a circuit portion 12 with a chopper pulse weighting circuit, overall 4, comprising a time register 4.1 and a chopper pulse weighting circuit 4.2, a switch-over device 7 yet to be explained as well as a logic AND-gate 5 and an OR-gate 6.

The circuit configuration has the capability of generating through a weighting circuit for the chopper signals an indexing-enable signal FSF whereby, in the event of overload, the step frequency can be affected without stepping losses occurring.

At the output side the circuit portion 12 is connected to the input of a signal generator 3. This signal generator 3 comprises two outputs a3.1, a3.2, on which are impressed the phase signals PH12, respectively PH34, shown in FIG. 2, lines c and d, during operation of the circuit configuration for the selection of the current direction for one chopped power output stage 1, 2 each. The output a3.1 of the signal generator 3 is connected to the input e1 of the power output stage 1. The output a3.2 is connected to the input e2 of the power output stage 2. As is the case in the known circuit configuration according to DE 41 21 617, already cited in the introduction, to each of the two power output stages 1, 2 is connected a current measuring resistor RS1, RS2 one terminal of which is at reference potential. At each of these current measuring resistors RS1, RS2 is tappable a measuring voltage US1, respectively US2, from which the current flow pauses, respectively the current flow phases, and thus the discrete chopper pulses, can be detected. At the output side the two power output stages 1, 2 are each provided with three outputs a1.1, a1.2, a1.3, respectively a2.1, a2.2, a2.3. In the present example the two outputs a1.1 and a1.2 of the power output stage 1 are connected to the series circuit of windings 1, 2 of the stepping motor and the outputs a2.1 and a2.2 of the power output stage 2 to the two terminals of the series circuit of windings 3, 4 of the stepping motor 11. At the particular third outputs a1.3, a2.3 of the power output stages 1, 2 are tappable the logic chopper signals CH12, respectively CH34, shown in FIG. 2, lines e and f.

Via a separate line, the logic chopper signals CH12, CH34-are impressed on one input terminal each of the switch-over device 7.

In the present embodiment example the switch-over device 7 is a 1-by-2 multiplexer with a first input e7.1, to which is connected the logic chopper signal CH34, and with a second input e7.2 to which the logic chopper signal CH12 is connected.

Figure 2:
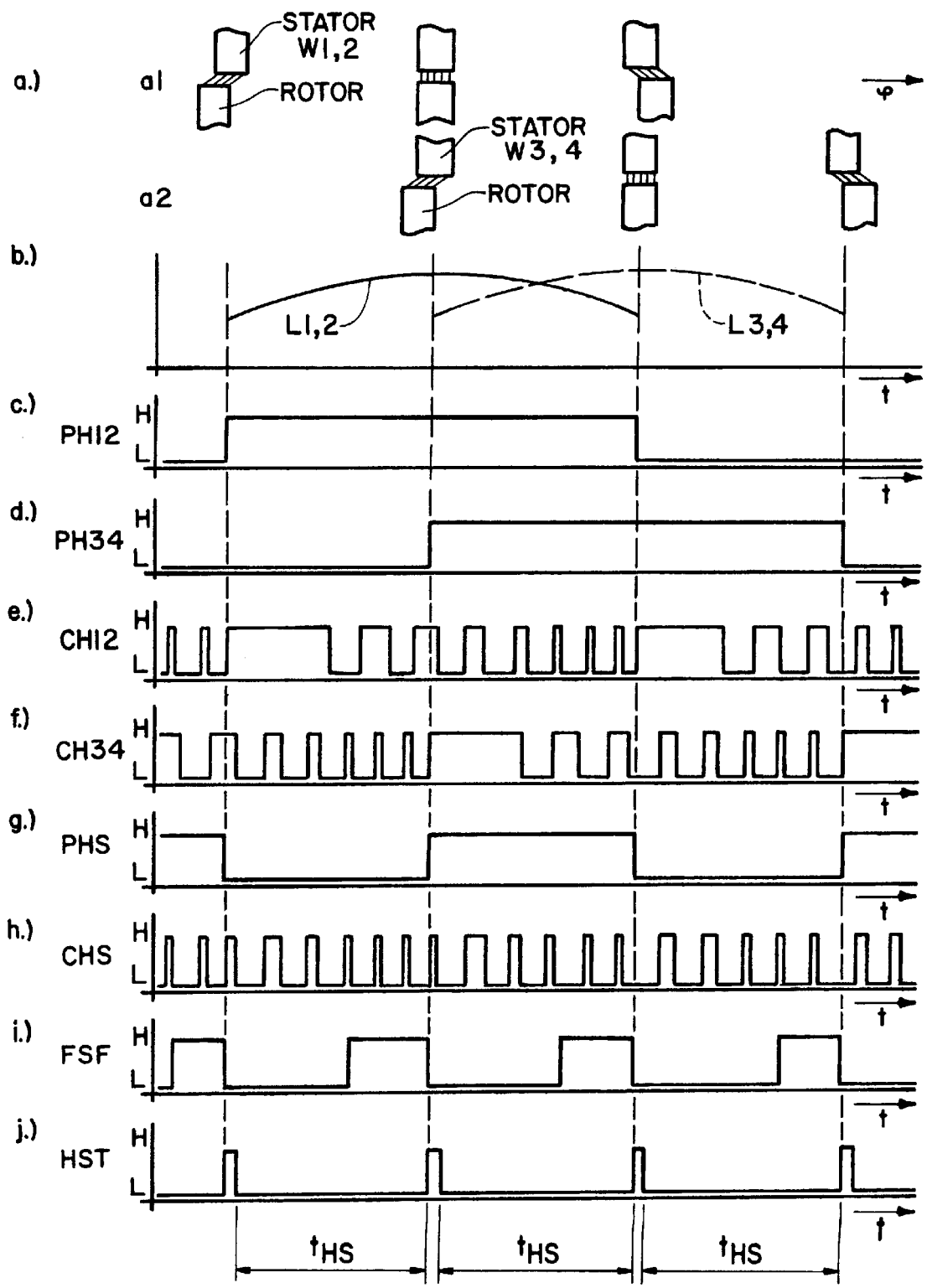

The switch-over device 7 is connected with its output terminal a.7 to an input e4.2 of the chopper pulse weighting circuit 4.2. Due to the switch-over device 7, either the logic chopper signal CH12 or the logic chopper signal CH34 is supplied, through suitable activation, to the input 4.2 of the chopper pulse weighting circuit 4.2 so that always only that signal CH12, CH34 is supplied to the chopper pulse weighting circuit 4.2 which is to be weighted with respect to the chopper pulse width for the succeeding winding switch-over. As the switch-over criterion serves a phase-selection signal PHS, such as is shown in FIG. 2, line g, over time. The phase-selection signal PHS is connected to an input e7.3 of the switch-over device 7. This input e7.3 is simultaneously the control input of the switch-over device 7.

The phase-selection signal PHS is generated in a suitable phase-selection circuit 14. The phase-selection circuit 14 is formed such that the phase-selection signal PHS indicates which of the phase signals PH12, PH34, has last shown a level change. As a comparison of lines c, d and g in FIG. 2 illustrates, in the embodiment example of FIG. 1 the phase signal PHS is generated such that it always assumes the logic level-H if in the signal PH34 a level change has occurred and it always assumes the logic level-L if in the signal PH12 a level change has occurred.

The phase-selection circuit 14 specifically comprises for this purpose an RS flip-flop 8 with an output a8 and two inputs e8.1 and e8.2. The output a8 is connected to the input e7.3 of the switch-over device 7. The phase-selection signal PHS is carried on this connection line. The input e8.1 serving as reset input is connected to an output a10 of an EXOR gate 10. An input e10.1 of this EXOR-gate 10 is connected directly to the output 3.1 SIC: a3.1 of the signal generator 3. The other input e10.2 is connected via an RC section also to the output 3.1 of the signal generator 3. The RC section comprises a resistor R10 connected between output a3.1 and input 10.2, as well as a capacitor C10 connected between reference potential and input e10.2 of the EXOR-gate.

The two inputs e9.1 and e9.2 of the EXOR-gate 9 are similarly connected to the output a3.2 of the signal generator 3. Specifically, the input e9.1 of the EXOR-gate 9 is connected directly to the output a3.2. In addition, this output a3.2 is connected via a resistor R9 to the input e9.2. A capacitor C9 is connected between reference potential and the input e9.2. The output a9 of the EXOR-gate 9 is connected to the input e8.2, serving as set input, of the RS flip-flop 8.

The circuit configuration of FIG. 1 comprises in addition a suitable control circuit, here a microprocessor 13. This microprocessor 13 is controlled internally by a clock generator and, in the present embodiment example, utilizes at least three output terminals a13.1, a13.2, and a13.3 as well as an input terminal e13.

The input terminal e13 of the microprocessor 13 is connected to an output terminal a3.3 of the signal generator 3. At the output a3.3 is present a signal STEPR which serves as acknowledge signal after a step has been executed. At output a13.1 is available a control signal HST which has the target frequency of the stepping motor activation. At output 13.2 is available a further control signal LST which has a base frequency, respectively minimum frequency, of the stepping activation and becomes active whenever the stepping motor 11 for some reason is to be indexed per force. With this control signal LST thus a minimum step frequency of the stepping motor 11 is forced. At output at 3.3 of the microprocessor 13 a direction signal DIR is tappable which can be supplied via a feed line to a signal input e3.2 of the signal generator 3.

The already cited circuit portion 12 is further connected in the following way: the output a13.2 is connected with an input e4.1 of the time register 4.1 of the chopper pulse weighting circuit 4.2. The time base $t_x$ stored in the time register 4.1 is the time at which the chopper pulses are weighted if the time base $t_x$ has been exceeded or fallen below. The time base $t_x$ is written via signal LST into the time register and if necessary can be changed at any time via the signal LST. Time $t_x$ corresponds therein to the High-time of signal LST.

The chopper pulse weighting circuit 4 forms the indexing-enable signal FSF which, in connection with the control signal HST, which sets the time condition for the maximum step frequency, via the AND-gate 5 for the winding indexing through the signal generator. Signal LST forces a winding indexing through the signal generator without the conditions being met via the indexing-enable signal FSF and the signal HST. The period during of signal LST thus determines the basic or start-up frequency and via the duration of the High pulse the time base $t_x$ is written into the time register of the chopper pulse weighting circuit. In addition, the output a13.2 of the microprocessor 13 is connected to a first input e6.1 of the OR-gate 6. The second input e6.2 of this OR gate 6 is connected to an output a5 of the AND-gate 5. The output a6 of the OR-gate 6 is connected to an input e3.1 of the signal generator 3. At output a6 of the OR-gate 6 the winding indexing signal is made available. An output terminal a4 of the copper pulse weighting circuit 4.2, at which a logic indexing-enable signal FSG is tappable, is connected to a first input terminal e5.1 of the AND-gate 5. The second input 5.2 of the AND-gate 5 is connected to the output a13.1 of the microprocessor 13.

An embodiment example of the chopper pulse weighting circuit 4 is shown schematically in FIG. 3. A clock generator 4.25 generates a clock frequency of, for example, 1 MHz. The clock signal is connected directly to the clock input C+of the counter 4.21 and via an AND-gate 4.11 to the clock input of counter 4.12. The High time of signal LST writes the time base $t_x$ into counter 4.12 and thus into the time register 4.1 such that with the L-H transition of the signal LST in a circuit structure 4.13 a short reset pulse for counter 4.12 is formed, which resets counter 4.12 and for the duration of the High pulses of LST the periods of the clock generator 4.25 are counted.

The counter 4.12 retains the counter count until again a High pulse of the signal LST occurs. The comparison counter 4.21 is held reset via signal CHS until CHS is Low. For this purpose the input e4.2 is connected via an inverter 4.24 to the reset input R of counter 4.21. The High time of signal CHS is to be weighted through the chopper pulse weighting circuit. If the signal CHS is High, the counter 4.21 counts.

The outputs Q0 . . . Qn of counters 4.12 and 4.21 are connected with the inputs A0 . . . An, respectively E0 . . .

En, of a value comparator 4.22 which compares the counts of counters 4.12 and 4.21. With the High-Low edge of the chopper signal CHB to be weighted, the output information of the value comparator 4.22 is written into a flip-flop 4.23 at whose output Q the indexing-enable signal FSF is present.

If the chopper pulse to be compared is longer than or equal to the value given by the time register, for the signal FSF a level Low is output. If the chopper pulse to be compared is shorter than the value given by the time register, a level High is formed for FSF.

The operational manner of the circuit configuration depicted in FIG. 1 is evident in connection with FIGS. 2 and 4.

In FIG. 2 are depicted signal traces characteristic for this control process during the current-activation phases of the motor windings at high speed without overload.

Lines a1 and a2 show the different positions of the magnet wheels/teeth of the stepping motor during the activation of the motor windings and line b shows therein the trace of the winding inductances with reference to the positions of the magnet wheels/teeth of the stepping motor.

It can be seen that at the optimum meshing of the magnet wheels/teeth of the motor the inductance of the motor winding has the maximum and, after the passing over of the maximum meshing, decreases again. If the rotor of a stepping motor rotates with sufficient angular speed, via the modulation of the winding inductance the energy content of the magnet system of the motor is changed such that the pulse width of the chopper pulses, while the current is fed into the coils, after the passing over of the maximum meshing of the magnet wheels/teeth, is markedly shorter than before the optimum meshing of the magnet wheels/teeth.

The actual duration of the chopper pulses during the optimum meshing of the magnet wheels/teeth is specific to the motor and is affected by the electrical operating conditions of the motor.

Lines c and d show the phase signals PH12 and PH34 for the logic driving of the output stages 1 and 2.

Line e shows the logic chopper signal CH12 of the output stage 1, which is connected with the phase signal PH12. Line f shows the logic chopper signal CH34 of output stage 2 which is connected with the phase signal PH34.

Line g shows the phase-selection signal PHS which selects which one of the chopper signals CH12 or CH34 is supplied to the chopper pulse weighting circuit 4 via the multiplexer 7. The selected chopper signal CHS is shown in line h.

Line i shows the indexing-enable signal FSF which assumes level High when the chopper pulse weighting circuit 4 has detected that the chopper pulses are shorter than the time base t, stored in the time register. Line j shows the signal of the control signal HST which sets the target step frequency for the stepping motor 11.

With each change of the phase signals PH12 or PH34 the HS timer with the time $t_x$ is started and the phase-selection signal PHS is switched so that the chopper signal is supplied to the chopper pulse weighing circuit 4, which is to be weighted for the succeeding winding switch-over with respect to the chopper pulse width. If the last phase change occurred in phase signal PH12, the chopper signal CH34 is weighted. If the preceding change occurred in phase signal PH34, the chopper signal CH12 is weighted and the succeeding phase change takes place in phase signal PH12. The winding indexing during the undisturbed running at high speed takes place exclusively via the signals HST and FSF. Since without overload the signal FSF is always formed before the expiration of the HS timer, the winding indexing takes place immediately after the HS timer has expired so that the motor runs precisely at the given step frequency.

For the stepping motor drive of the document distribution device a phase current of 350 mA with a maximum stp frequency of 600 Hz is supplied to the stepping motor. Under the given conditions the drive is not directly controllable from stand-still to maximum step frequency so that the stepping motor is initially started at a starting frequency of 300 Hz and is subsequently driven step by step into the target frequency.

In FIG. 4 are depicted the signals characteristic for controlling the motor for the different running phases. Via signal LST (line a) the motor is driven without further additional conditions. As already described, the High time of the signal LST contains the time base $t_x$ which is written into the time register 4.1 of the chopper pulse weighting circuit 4. In the concrete example the time $t_x$=1s µs.

The length of the period $t_x+t_{LS}$ determines the starting step frequency of 300 Hz, which is activated, for example, for four motor steps in order to bring the driving -initially into a controlled motion. The length of period of signal LST is 3.33 ms so that a starting frequency of 300 Hz results. Each L-H transition of LST leads to winding indexing through the phase signals PH12 or PH34 (cf. Lines e, f).

Each phase change of signals PH12/PH34 is acknowledged by the signal generator 3 with the signal STEPR and reported back to the microprocessor.

Due to each step acknowledgment through signal STEPR the LS timer is started anew through the microprocessor. During the start-up steps the signal HST of the high-speed timer remains constant at Low so that the winding indexing takes place exclusively via the signal LST and the signal FSF, formed already during the start-up steps, has no effect on the indexing of the phase signals. After the activation for example of the four start-up steps, the driving is in sufficiently continuous motion and the signal FSF (cf. Line c) is utilizable. With the acknowledgment of the last phase change of the phase signals PH12/PJ34 of the last start-up step via signal STEPR, apart from the LS timer with 3.33 msec, the HS timer is also started with 1.66 msec so that via the HS timer signal HST a maximum step frequency of 600 Hz is set.

The acceleration phase is characterized thereby that the HS timer HST has expired before the indexing-enable signal FSF is switched to High and therewith indicates that the optimum meshing of the magnet wheels/teeth in the stepping motor 11 is passed over.

If both signals FSF and HST are High, at output a6 of the AN-gate 5 level High is generated which via the OR-gate 6 affects the winding indexing through the signal generator 3. Thereby the winding indexing is brought about through the signal generator 3 when the HS timer has expired and the optimum meshing of the magnet wheels/teeth in motor 11 is passed over.

In the acceleration phase of motor 11, in which acceleration from the start-up frequency of 300 Hz into the target frequency of 600 Hz takes place, no fixed number of steps with fixed stepping times is given. The motor 11 is controlled through the described circuit configuration automatically depending on the load and operating conditions from the start-up frequency into the target frequency.

When the indexing-enable signal FSF is formed for the first time before the HS timer (HST) has expired, the acceleration is terminated and the winding indexing is controlled via the time condition of the signal HST. Motor 11 subsequently runs at the target frequency of 600 Hz which is given by the time $t_{HS}$=1.66 ms.

The phase of the constant running 8 is characterized thereby that the signal FSF always switches to Highafter expiration of time $t_{HS}$ of the HS timer so that the winding indexing frequency is determined by the time $t_{HS}$ of the HS timer.

Due to changing loading for motor 11 initially only the time varies which switches the signal FSF before expiration of the HS timer time to High with the step frequency still remaining constant. If the overloading increases such that the signal FSF switches only after expiration of the HS timer time $t_{HS}$ to High, FSF determines the winding indexing and the winding indexing frequency is lower than was given by time $t_{HS}$.

The motor loading can increase until the winding indexing frequency has been reduced nearly to the start-up or base frequency without the described activation process being left. If the mechanical overload for motor 11 is absent again the driving is automatically without any special routine taken back into the target frequency through microprocessor 13. However, if the overload increases further or if the indexing-enable signal FSF does not switch to High, after expiration of time $t_{LS}$ of the LS timer the signal LST is switched to High for the length of $t_x$ which, by necessity, leads to the winding indexing through the signal generator 3.

Only if the load conditions for the stepping motor 11 are so great that the motor can no longer follow the base frequency of 300 Hz, does a step loss occur.

With this control process it is ensured that the driving is automatically accelerated from a start-up frequency of 300 Hz in the shortest possible time into the target frequency of 600 Hz and, in the event of overload, the step frequency is reduced automatically without step loss such that an equilibrium between motor load and motor torque develops and, in the absence of overloading, the target step frequency is again reached in the shortest possible time.

The braking phase of the motor, in which the motor is driven from the maximum step frequency of 600 Hz into the base frequency of 300 Hz, in order to be subsequently stopped out of the base frequency in such a way that it is correct with respect to position, takes place either by way of the stepwise extension of $t_{HS}$ of 1.66 ms up to 3.33 ms or by the control, rigid with respect to time, via the signal LST of the LS timer also with graduated times.

With the described activation process it impossible to control the stepping motor for controlling the document distribution device such that the stepping motor, under the conditions that the transfer speed of the documents by the laser printer is lower than the acquisition speed of the document distribution device, runs true to step and does not fallout of step.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. Circuit configuration for affecting the step frequency in the winding-current activation of stepping motor drives with chopped power output stages (1, 2) which can be activated by direction-dependent logic phase signals (PH12, PH34) of a signal generator (3) for the current feed into the motor windings of the stepping motor drive, and with a chopper pulse weighting circuit (4.2) connected at the output side to the signal generator (3), the chopper pulse weighting circuit being supplied logic chopper signals (CH12, CH34) tapped at the power output stages (1, 2) at the output side, characterized in that a device (7, 14) connected to the chopper pulse weighting circuit (4.2) is provided, which conducts always only that chopper signal (CH12, CH34) to the chopper pulse weighting circuit (4.2) which is decisive for the next winding switching-over.

2. Circuit configuration for affecting the step frequency in the winding-current activation of stepping motor drives with chopped power output stages (1, 2) which can be activated by direction-dependent logic phase signals (PH12, PH34) of a signal generator (3) for the current feed into the motor windings of the stepping motor drive, and with a chopper pulse weighting circuit (4.2) connected at the output side to the signal generator (3), the chopper pulse weighting circuit being supplied logic chopper signals (CH12, CH34) tapped at the power output stages (1, 2) at the output side, characterized in that a device (7, 14) connected to the chopper pulse weighting circuit (4.2) is provided, which conducts always only that chopper signal (CH12, CH34) to the chopper pulse weighting circuit (4.2) which is decisive for the next winding switching-over; the circuit further characterized in that the device (7, 14) a phase-selection circuit (14) and a switch-over device (7), that the phase-selection circuit (14) generates a phase-selection signal PHS which indicates in which of the phase signals (PH12, PH34) a change of the logic level has occurred last, and that the switch-over device (7) comprises a first input (e7.2) for connecting a first chopper signal (CH34) and a second input (e7.1) for connecting a second chopper signal (CH12), a control connection (e7.3) for connecting the phase-selection signal PHS and an output connection (a7) connected with an input (e4.2) of the chopper pulse weighting circuit (4.2).

3. Circuit configuration as stated in claim 2, characterized in that the switch-over device (7) is a 1-by-2 multiplexer.

4. Circuit configuration as stated in claim 2 or 3, characterized in that the phase-selection circuit (14) comprises an RS flip-flop (8) with an output (a8) at which the phase-selection signal PHS is tapped, and with a reset input (e8.1) as well as a set input (e8.2), which are in each instance connected via a configuration with an RC-section (R9, C9; R10, C10) and a logic gate (9, 10) to an output (a3.1, a3.2) of the signal generator (3) at which a phase signal (PH34; PH12) is tapped.

5. Circuit configuration as stated in claim 4, characterized in that the configuration comprises an EXOR-gate (9; 10) whose first input (e9.1; e10.1) is connected directly and whose second input (e9.2; e10.2) via the RC-section (R9, C9; R10, C10) to the particular output (a3.2; a3.1) of the signal generator (3).

6. Circuit configuration as stated in one of claims 1 to 3, characterized in that the chopper pulse weighting circuit (4) comprises for a time base to be weighted a time register (4.1) whose register content is changeable.

7. Circuit configuration as stated in claim 6 characterized in that the time register (4.1) is connected to a microprocessor (13) and the register content is variable through a control signal LST which can be made available by the microprocessor (13).

8. Circuit configuration as stated in claim 7, characterized in that the signal generator (3) comprises a trigger input (e3.1), that the rigger input (e3.1) is connected to an output (a6) of an OR-gate (6), that a first input (e6.1) of the OR-gate (6) is connected to the input (34.1) of the time register (4.1)

and furthermore has a connection to an output (a13.2) of a microprocessor (13) at which the control signal LST can be tapped, that a second input (e6.2) of the OR-gate (6) is connected to an output (a5) of an AND-gate (5), that a first input (e5.1) of the AND-gate (5) is connected to an output (a4) of the chopper pulse weighting circuit (4.2) and a second input (e5.2) of the AND-gate (5) is connected to an output (a13.1) of the microprocessor (13) at which a target frequency signal HST of the circuit configuration is tappable.

9. Circuit configuration as stated in one of claims 1 to 3 characterized in that a microprocessor (13) is provided which is connected to the signal generator (3).

10. Circuit configuration as stated in claim 9, characterized in that the signal generator (3) comprises a trigger input (e3.1), that the trigger input (e3.1) is connected to an output (a6) of an OR-gate (6), that a first input (e6.1) of the OR-gate (6) is connected to the input (e4.1) of a time register (4.1) and furthermore has a connection to an output (a13.2) of the microprocessor (13) at which a control signal LST can be tapped, that a second input (e6.2) of the OR-gate (6) is connected to an output (a5) of an AND-gate (5), that a first input (e5.1) of the AND-gate (5) is connected to an output (a4) of the chopper pulse weighting circuit (4.2) and a second input (e5.2) of the AND-gate (5) is connected to an output (a13.1) of the microprocessor (13) at which a target frequency signal HST of the circuit configuration is tappable.

11. Circuit configuration as stated in claim 9, characterized in that a time register (4.1) is connected to the microprocessor (13) and the register content is variable through a control signal LST which can be made available by the microprocessor (13).

12. Circuit configuration, as stated in one of claims 1 to 3, characterized in that a start-up circuit is provided which supplies to the signal generator (3), for the purpose of forcing a winding switch-over, pulses with a start-up frequency which is lower than the target frequency of the stepping motor drive, with these pulses becoming effective at the signal generator (3) only if no indexing-enable signal FSF is formed or the control signal HST does not switch to High.

13. Circuit configuration as stated in one of claims 1 to 3, characterized in that the device (7, 14) and the chopper pulse weighting circuit (4.2) are realized by a microprocessor.

14. Circuit configuration as stated in claim 13, characterized in that the microprocessor comprises a signal generator.

* * * * *